United States Patent Office 2,778,475
Patented Jan. 22, 1957

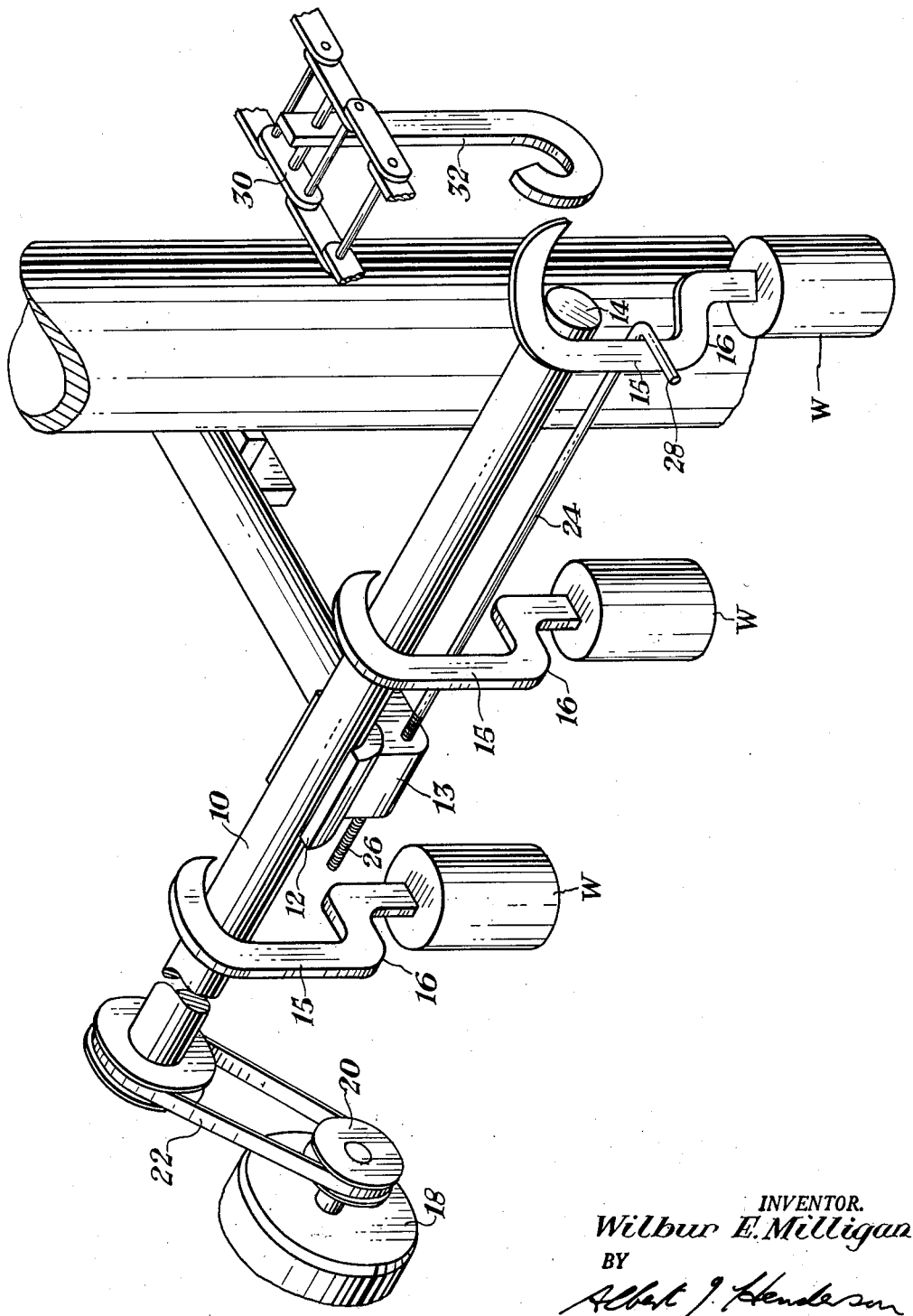

2,778,475
CONVEYOR APPARATUS

Wilbur E. Milligan, Quincy, Mass.

Application March 11, 1954, Serial No. 415,663

4 Claims. (Cl. 198—33)

This invention relates to new and improved conveyor apparatus and more particularly to a roll conveyor adapted to impart translational movement to objects supported thereby.

Roll conveyors of types heretofore used have comprised rotatable rolls which are cylindrical in form with translational movement being imparted to elements placed thereon by means of threads formed on the outer surface of the roll. Such threaded roll conveyors impart positive displacement to objects conveyed thereby and it is impossible to interrupt travel of an object along the roll without stopping rotation of the roll. It is an object of this invention to eliminate this difficulty, permitting translational movement of a supported object when the same is uninhibited and permitting it to come to a stop against an abutment without requiring that rotation of the roll be terminated.

Another object of this invention is to utilize a roll conveyor for collection and storage of material objects as well as the transportation thereof.

Another object of this invention is to convey a mass along a rotatable beam at a predetermined rate of speed.

The above objects may be accomplished by utilizing a rotatable inclined beam from which a mass to be transported is suspended freely by a hook or the like, the angle of inclination of the beam to the horizontal being less than the angle of repose of the mass as determined by the coefficient of friction of the beam and the hook so that the hook is held stationary by static friction when the beam is not rotating. With such an arrangement, rotation of the beam will overcome the static friction and permit the hook to slide along the beam under the influence of gravity, the point of contact of the hook and beam tracing a helix along the surface of the beam.

Furthermore, with roll conveyors of types heretofore used, movement of the transported elements around corners has been effected by means of a rotatable flexible shaft connecting two conveyor rolls extending in different directions. Such flexible shafts are a source of trouble and will not support substantial loads. It is an object of this invention to eliminate the necessity for such flexible shafts in changing the direction of travel of elements transported on a roll conveyor.

Another object of this invention is to convey supported elements around corners by transferring them from one conveyor to another by means of simple apparatus.

Another object of this invention is to remove, from a roll type conveyor, elements which have been transported thereby to a predetermined location.

To accomplish the above objects, a hook, movable on a conveyor roll, is provided and means is also provided for rotating the hook at the end of the roll to swing the same into the path of grappling means on a second conveyor.

Other objects and advantages will appear from the following specification taken in connection with the accompanying drawing which is a fragmentary perspective view of apparatus embodying this invention.

Referring more particularly to the drawing, the conveyor portion of the apparatus may take the form of a beam or shaft roller 10 having a regular surface, either cylindrical or polygonal. In this embodiment an elongated cylindrical roller 10 is rotatably mounted on a plurality of suitable bearings 12 (only one of which is shown) with a free discharge end 14 extending beyond the illustrated bearing 12. The bearings 12 are mounted on suitable supports 13 projecting from any convenient location for this purpose.

The roller 10 is mounted to slant downwardly from the horizontal toward the free end 14. A plurality of circulating members of the conveyor system in the form of hooks 16 is suspended from the roller 10 and have sufficient radius of curvature in the bight portion 15 to clear the bearings 12 and supports 13 when traveling from one end to the other of the roller 10. When the roller 10 is stationary, the static friction between the crest of the hooks 16 and the surface of the roller 10 prevents slidable movement of the hooks 16 toward the free end 14. To assure this static condition when the roller is not rotating, the angle of inclination due to the downward slant of the roller 10 is less than the angle of repose of the hooks 16 as determined by the coefficients of friction of the roller 10 and hooks 16. However, when the roller 10 is rotated, static friction between the hooks 16 and the surface of the roller 10 is overcome and the hooks 16 slide downwardly along the roller 10 toward the free end 14 and thus provide the required conveyor motion along the roller 10. As is customary in this type of conveyor, the depending ends of the hooks 16 are formed to support objects W to be conveyed by the conveyor system. Such objects are attached in any suitable manner depending on their nature to the hooks 16 and, as indicated in the drawing, one such object W may be carried by each hook but other arrangements may be made as will be apparent. Suitable means is provided for rotating the roller 10 in its bearings 12 and is here shown as a motor 18 connected to the roller 10 through a sheave 20 and belt 22.

To prevent the hooks 16 from dropping off the free end 14 of the roller 10, abutment means is provided adjacent the free end 14 and is here shown as a rod 24 having one end 26 threaded into the bearing support 13 and having an offset portion 28 at the other end to provide an abutment surface engageable by the hooks 16. The rod 24 extends parallel to the axis of the roller 10 and, since it is threaded into the bearing 12, it may be adjusted axially of the roller 10 simply by rotation thereof.

The rod 24 is positioned with the offset end 28 adjacent the free end 14 of the roller 10 and projecting outwardly therefrom to engage the hooks 16 as they approach the free end 14 of the roller. As each hook 16 moves up to the free end 14 of the roller 10, the bight portion 15 of the hook 16 contacts the offset portion 28 to restrain the bight portion 15 from further movement parallel to the axis of the roller 10. The crest of the hook 16, however, continues to be transported by the roller 10 so that the bight portion 15 will be rotated about the point of contact with the offset portion 28 to swing the depending end of the hook 16 beyond the free end 14 of the roller 10. The hook 16 is then in a position to be removed from the roller 10 by grappling means now to be described which travel in a path past the free end 14 of the roller 10.

The grappling means is here shown as comprising a chain type conveyor 30 extending at an angle to the axis of the roller 10 and carrying a plurality of hooks 32 (only one of which is shown). The hooks 32 are positioned to be respectively interengaged with the hooks 16 when the same extend beyond the free end 14 of the roller 10. The offset portion 28 of the rod 24 preferably extends parallel to the path along which the chain conveyor 30 and hooks 32 travel so that, after interengagement of a hook 16 with a hook 32, the engaged hook 16 may follow along the path of the chain conveyor 30 without restriction, simply sliding out of engagement with the offset portion 28.

If the roller 10 is to be used for storage purposes, the chain conveyor 30 may be eliminated so that a hook 16 in engagement with the offset portion 28 of the rod 24 will remain at the free end 14 of the roller 10, the offset portion 28 overcoming the pull of gravity which moved the hook down the roller. The next hook 16, moving down the roller 10, will engage the hook 16 which is abutting the offset portion 28 and it also will be stopped. Translational movement of other hooks 16 moving down the roller 10 will be sequentially terminated as they engage hooks 16 which are at rest. This action may continue until the entire roller 10 is filled with hooks 16.

It will be apparent from the foregoing that new and useful apparatus has been provided for transporting units on a non-threaded roller, removing transported units from a roller type conveyor, and transferring such units to another conveyor to thereby change the direction of travel of the conveyed units and accordingly the disclosed apparatus accomplishes the objects of the invention.

While a preferred embodiment of the invention has been disclosed herein, it is to be understood that the same is illustrative only as it may be changed or modified to meet different conditions and requirements without departing from the scope of the appended claims.

I claim:

1. Conveyor apparatus comprising a single elongated beam having a regular surface and of substantially uniform diameter throughout the length thereof, a movable element supported by said beam and having a hooked surface in engagement with said beam surface, means for mounting said beam for rotation about its axis and sloping downward from the horizontal toward one end thereof, the angle of inclination of the axis of said beam to the horizontal being less than the angle of repose of said element as determined by the coefficients of friction of said surfaces so that said element will be held stationary solely by static friction while said beam is stationary, and means for rotating said beam about its axis for overcoming said static friction and permitting said element to move toward said one end under influence of gravity.

2. Conveyor apparatus as claimed in claim 1 wherein abutment means is provided adjacent said one end of said beam, said abutment means being engageable by said element to prevent movement of said element beyond said one end of said beam despite rotation of said beam.

3. Conveyor apparatus as claimed in claim 1 wherein grappling means is provided for movement in a path adjacent said one end of said beam, and means adjacent said beam and engageable by said element upon said longitudinal movement for moving said element into said path to be picked up by said grappling means.

4. Conveyor apparatus comprising a rotatable shaft having a free end and adapted to be mounted sloping downward from the horizontal toward said free end, at least one hook carried on said shaft and movable longitudinally of said shaft toward said free end upon rotation of said shaft, a conveyor adjacent said free end including at least one hook movable in a path beyond said free end, abutment means adjacent said free end, said abutment means including a surface extending substantially parallel with said path to be engageable by the first said hook upon said longitudinal movement and coacting with said shaft upon continued rotation thereof for swinging at least a portion of said first hook beyond said free end into said path to be picked up by the second said hook.

References Cited in the file of this patent
UNITED STATES PATENTS

| | | |
|---|---|---|
| 573,560 | Whitmarsh | Dec. 22, 1896 |
| 1,460,685 | Seaman | July 3, 1923 |
| 1,749,086 | Plumb | Mar. 4, 1930 |
| 2,078,503 | Meiser | Apr. 27, 1937 |
| 2,651,401 | Vincent | Sept. 8, 1953 |
| 2,680,344 | Capellazzi | June 8, 1954 |